US012510050B2

(12) United States Patent
Tan et al.

(10) Patent No.: US 12,510,050 B2
(45) Date of Patent: Dec. 30, 2025

(54) MODULAR WIND TURBINE BLADE AND CONNECTION STRUCTURE THEREOF

(71) Applicant: NEWTECH GROUP CO., LTD., Changzhou (CN)

(72) Inventors: Kunlun Tan, Changzhou (CN); Yelin Liu, Changzhou (CN); Jian Zhang, Changzhou (CN); Ning Li, Changzhou (CN); Lei Cao, Changzhou (CN); Juncheng Chen, Changzhou (CN)

(73) Assignee: NEWTECH GROUP CO., LTD., Changzhou (CN)

( * ) Notice: Subject to any disclaimer, the term of this patent is extended or adjusted under 35 U.S.C. 154(b) by 0 days.

(21) Appl. No.: 18/827,681

(22) Filed: Sep. 7, 2024

(65) Prior Publication Data

US 2024/0426271 A1    Dec. 26, 2024

Related U.S. Application Data

(63) Continuation of application No. PCT/CN2023/124317, filed on Oct. 12, 2023.

(30) Foreign Application Priority Data

Mar. 20, 2023  (CN) .......................... 202310265655.0

(51) Int. Cl.
F03D 1/06        (2006.01)
(52) U.S. Cl.
CPC ......... *F03D 1/0677* (2023.08); *F03D 1/0675* (2013.01); *F03D 1/0679* (2023.08); *F03D 1/0681* (2023.08); *F05B 2240/302* (2013.01)
(58) Field of Classification Search
CPC . F03D 1/0677; F03D 1/0675; F05B 2240/302
See application file for complete search history.

(56) References Cited

U.S. PATENT DOCUMENTS 8,192,169 B2 *  6/2012  Piasecki ................... F03D 9/00
                                                            29/889.71
9,745,956 B2 *  8/2017  Johnson ............... F03D 1/0658
(Continued)

FOREIGN PATENT DOCUMENTS

CN         203939632 U   * 11/2014
CN         105952580 A      9/2016
(Continued)

OTHER PUBLICATIONS

English translation of DE102012111219B4 (Year: 2016).*
English translation of CN203939632U (Year: 2014).*
English translation of ES2385726A1 (Year: 2012).*

*Primary Examiner* — Courtney D Heinle
*Assistant Examiner* — Esley Le Fisher
(74) *Attorney, Agent, or Firm* — SZDC Law PC

(57) ABSTRACT

The present invention relates to a modular wind turbine blade and connection structure thereof. The blade module includes a shell and a load-bearing beam and a bearing web provided therein. The load-bearing beam comprises a connecting beam, an auxiliary beam plate, a trailing edge beam, and a T-shaped beam. The connecting beam is provided on both sides of the middle portion, the trailing edge beam is embedded at the edge of the trailing edge portion, the auxiliary beam plate is provided in a plurality along the circumferential direction of the blade, and the T-shaped beam is connected to two adjacent auxiliary beam plates respectively. The load-bearing beam is fitted with the shell, and a support frame formed by the load-bearing beam in conjunction with the bearing web conforms to the contour shape of the blade.

9 Claims, 9 Drawing Sheets

(56) References Cited

U.S. PATENT DOCUMENTS

| | | | |
|---|---|---|---|
| 10,830,207 B2 * | 11/2020 | Merzhaeuser | F03D 1/0675 |
| 11,920,556 B2 * | 3/2024 | Bech | F03D 1/0675 |
| 12,311,627 B2 * | 5/2025 | Tan | B29D 99/0028 |
| 2010/0135818 A1 * | 6/2010 | Babu | F03D 1/0675 |
| | | | 29/889.7 |
| 2010/0239865 A1 * | 9/2010 | Kallinen | B29C 70/44 |
| | | | 156/196 |
| 2017/0058866 A1 * | 3/2017 | Caruso | F03D 1/0675 |
| 2019/0055921 A1 | 2/2019 | Danielsen | |
| 2024/0336017 A1 * | 10/2024 | Callén Escartín | B29C 66/7212 |
| 2024/0426272 A1 * | 12/2024 | Tan | B29C 70/42 |

FOREIGN PATENT DOCUMENTS

| | | | | |
|---|---|---|---|---|
| CN | 113787658 | A | 12/2021 | |
| CN | 115573854 | A | 1/2023 | |
| CN | 115977866 | A | 4/2023 | |
| CN | 115977867 | A | 4/2023 | |
| DE | 102012111219 | B4 * | 6/2016 | F03D 1/0658 |
| ES | 2385726 | A1 * | 7/2012 | F03D 13/10 |
| GB | 2488099 | A * | 8/2012 | F03D 1/0675 |
| WO | 2020119874 | A1 | 6/2020 | |

\* cited by examiner

MODULAR WIND TURBINE BLADE AND CONNECTION STRUCTURE THEREOF

This application is a Continuation Application of PCT/CN2023/124317, filed on Oct. 12, 2023, which claims priority to Chinese Patent Application No. 202310265655.0, filed on Mar. 20, 2023, which is incorporated by reference for all purposes as if fully set forth herein.

TECHNICAL FIELD

The present invention relates to the field of wind turbine blade, in particular to a modular wind turbine blade and connection structure thereof.

BACKGROUND

As a renewable energy, wind energy has the advantages of low development cost, mature technology, and wide distribution, making it a key direction for the development of renewable energy. In order to fully utilize wind energy resources, the improvement of the aerodynamic shape of wind turbine blades and the increase of blade size are important means to increase the power generation of wind turbines. Therefore, the gradual move towards large-scale wind turbines is a trend in the development of wind power technology. However, areas rich in wind resources are often remote and inaccessible areas with poor transportation conditions which limit the large-scale wind turbines.

At present, wind turbine blades are generally manufactured using fiber-reinforced polymer based composite materials. The production process of composite blades has strict environmental and process requirements, and the composite materials used in ultra long blades are more sensitive to production conditions, making it difficult to control blade quality. As such, when the blade length reaches a certain limit, it is an effective method to solve the problem of large-scale wind turbines by adopting segmented blade structure, characterized by production in existing factories, transportation in segments and assembly on site. However, as the blade size increases, the overweight blade structure is not conducive to maintaining stable operation when the wind turbine is running. Therefore, reducing blade weight and cost while ensuring overall blade structural performance is another technical problem in the development of wind power technology.

SUMMARY

The present invention provides a modular wind turbine blade and connection structure thereof to effectively solve the problems discussed above.

To this end, the present invention adopts technical solutions described below.

A modular wind turbine blade comprises a plurality of blade modules arranged along the axial direction thereof, wherein the blade module comprises a shell and a load-bearing beam and a bearing web provided therein, wherein the load-bearing beam is fitted with the shell, and the bearing webs is provided along the chord length of the blade in a plurality.

The shell comprises a windward surface and a leeward surface, and is provided in form of a leading edge portion, a middle portion, and a trailing edge portion along the chord length direction of the blade. The load-bearing beam includes a connecting beam, an auxiliary beam plate, a trailing edge beam, and a T-shaped beam. The connecting beam is provided on both sides of the middle portion. The trailing edge beam is embedded at the edge of the trailing edge portion. The auxiliary beam plate is provided on the middle portion and the trailing edge portion, and is provided in a plurality along the circumferential direction of the blade. The T-shaped beam is connected to two adjacent auxiliary beam plates respectively.

Further, the trailing edge beam and the T-shaped beam are both arranged along the axial direction of the blade, and extend from or retract into the end face of the shell. The trailing edge beams and the T-shaped beams correspondingly provided on two adjacent blade modules abut with each other at end thereof.

Further, a plurality of the T-shaped beams is provided corresponding to the windward surface and the leeward surface along the circumferential direction of the blade, extending from or retracting into the end face of the shell at intervals.

Further, the connecting beam is provided in one piece, comprising a main spar cap and an auxiliary spar cap that have a ring spar cap on the same side thereof, both the main spar cap and the auxiliary spar cap being provided along the axial direction of the blade.

The main spar cap and the auxiliary spar cap are provided close to the leading edge portion and the trailing edge portion respectively, and the main spar cap is thicker than the auxiliary spar cap.

Further, the ring spar cap cooperates with the main spar cap and the auxiliary spar cap, with a notch portion formed between the three, the notch portion being configured to shrink towards the ring spar cap.

Both sides of the ring spar cap extend to the main spar cap and the auxiliary spar cap respectively, and are configured to shrink towards the notch portion.

Further, the bearing web comprises a first web, a second web and a third web each provided with an arc-shaped notch at an end thereof.

The first web is disposed on the leading edge portion and abuts with the inner wall on both sides of the shell respectively, the second web abuts with the two connecting beams respectively, and the third web abuts with the auxiliary beam plates on both sides of the shell respectively.

Further, the T-shaped beam comprises a horizontal plate and a vertical plate arranged perpendicular thereto, and is fixedly connected to the two auxiliary beam plates through the horizontal plate.

A lap is provided on the side of the auxiliary beam plate facing the blade shell corresponding to the horizontal plate. The lap is concave towards its side away from the blade shell by a depth adapted to the thickness of the horizontal plate.

Further, a hatch notch is provided at an end of the shell, and two hatch notches correspondingly provided on two connected blade modules form a hatch hole.

The hatch hole is provided on the leading edge portion of the shell, as well as on the windward side and the leeward side of the middle portion and the trailing edge portion, respectively.

A connection structure of modular wind turbine blades for use in the modular wind turbine blade, wherein the connecting beam and the T-shaped beam are respectively provided with a first connection structure and a second connection structure at an end thereof, and wherein two first connection structures and two second connection structures on two adjacent blade modules are respectively fixedly connected through a first connecting piece and a second connecting piece.

Further, the first connection structure comprises a plurality of first ring holes and a plurality of second ring holes provided along different circumferential directions of the blade, wherein the first and second ring holes are staggered and connected to an end face of the connecting beam through axle holes.

Further, the first ring hole is provided in form of a circular through hole, the second ring hole is provided in form of a gourd shaped through hole, and the first connecting piece comprises a cylindrical nut, a double-headed bolt, a semi-cylindrical spacer and a round nut.

The cylindrical nut and the semi-cylindrical spacer are disposed in the first ring hole and the second ring hole respectively. An end of the double-headed bolt is screwed to the cylindrical nut through the axle hole, or screwed to the round nut passing through the semi-cylindrical spacer.

Further, the second connection structure comprises a mortise provided at the end of the T-shaped beam, and the second connecting piece comprises a tenon that matches two mortises on the opposite T-shaped beams of the two blade modules.

The mortise is provided in form of a triangular structure, and the tenon is provided in form of a diamond structure.

The advantageous effects of the present invention are explained below.

In the present invention, each of the load-bearing beams and bearing webs can be integrally formed using composite materials. The load-bearing beam is fitted with the shell, and a support frame formed by the load-bearing beam in conjunction with the bearing web conforms to the contour shape of the blade. By forming a shell structure with an outer skin wrapped around the support frame, the structural stability of the blade module is ensured while reducing the blade mass.

Fixed connection between adjacent blade modules is achieved by the two connection structures provided at the end of the connecting beam and the T-beam respectively. In the respective blade modules, the load-bearing beam has a stable structure, and thus the stable connection of the two blade modules is achieved through connecting pieces provided on the two load-bearing beams.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

Figure 1:
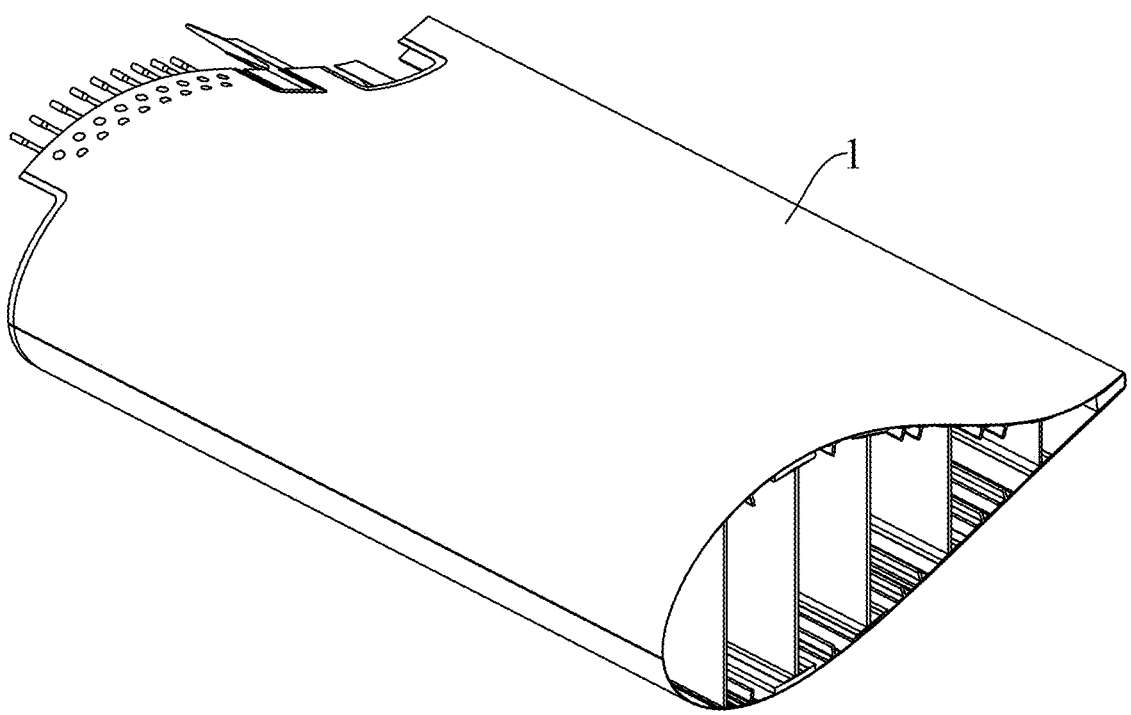
FIG. 1 is a schematic diagram of the structure of the blade module according to an embodiment of the present invention.

Reference signs: 1. shell; 11. windward side; 12. leeward side; 13. leading edge portion; 14. middle portion; 15. trailing edge portion; 16. hatch notch; 17. hatch hole; 2. load-bearing beam; 21. connecting beam; 211. ring spar cap; 212. auxiliary spar cap; 213. main spar cap; 214. notch portion; 22. auxiliary beam plate; 221. lap; 23. trailing edge beam; 24. T-shaped beam; 241. horizontal plate; 242. vertical plate; 3. bearing web; 31. first web; 32. second web; 33. third web; 34. arc-shaped notch; 4. first connection structure; 41. first ring hole; 42. second ring hole; 43. axle hole; 5. second connection structure; 51. tenon; 6. first connecting piece; 61. cylindrical nut; 62. double-headed bolt; 63. semi-cylindrical spacer; 64. round nut; 7. second connecting piece; 71. Tenon.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a portion of the embodiments of the present invention, rather than all the embodiments.

It should be noted that when an element is referred to as being "fixed to" another element, it can be directly on the another element or an intermediate element may also be present. It should be noted that when an element is referred to as being "connected to" another element, it can be directly on the another element or an intermediate element may also be present. The terms "vertical", "horizontal", "left", "right" and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

FIGS. 1 to 13 show a modular wind turbine blade comprising a plurality of blade modules arranged along the axial direction thereof, wherein the blade module comprises a shell 1 and a load-bearing beam 2 and a bearing web 3 provided therein, wherein the load-bearing beam 2 is fitted with the shell 1, and the bearing web 3 is provided along the chord length of the blade in a plurality. The shell 1 comprises a windward surface 11 and a leeward surface 12, and is provided in form of a leading edge portion 13, a middle portion 14, and a trailing edge portion 15 along the chord length direction of the blade. The load-bearing beam 2 includes a connecting beam 21, an auxiliary beam plate 22, a trailing edge beam 23, and a T-shaped beam 24. The connecting beam 21 is provided on both sides of the middle portion 14. The trailing edge beam 23 is embedded at the edge of the trailing edge portion 15. The auxiliary beam plate 22 is provided on the middle portion 14 and the trailing edge portion 15, and is provided in a plurality along the circumferential direction of the blade. The T-shaped beam 24 is connected to two adjacent auxiliary beam plates 22 respectively.

Figure 2:
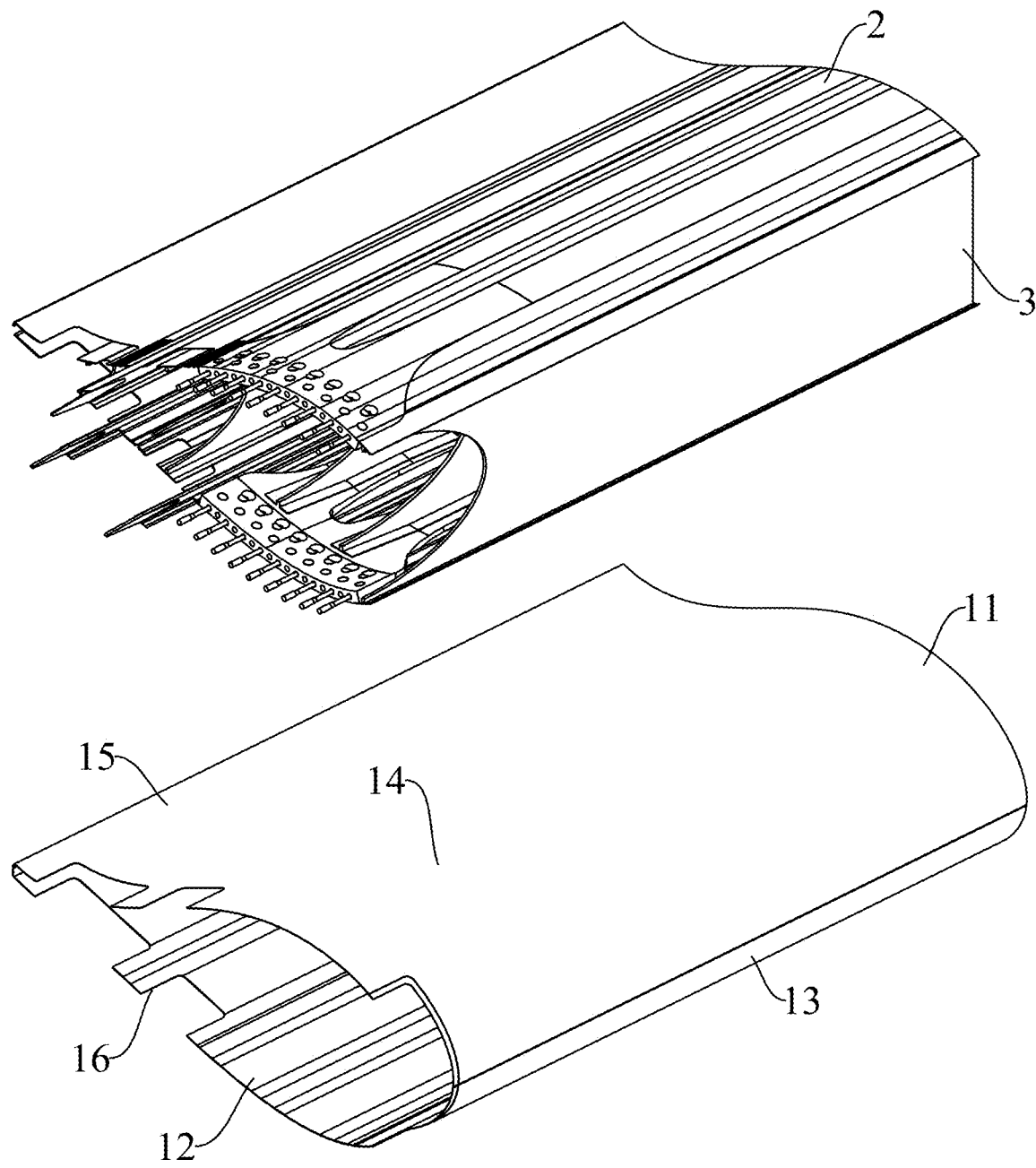
FIG. 2 is a schematic diagram of the structure of the supporting beam and the shell according to an embodiment of the present invention.
Figure 3:
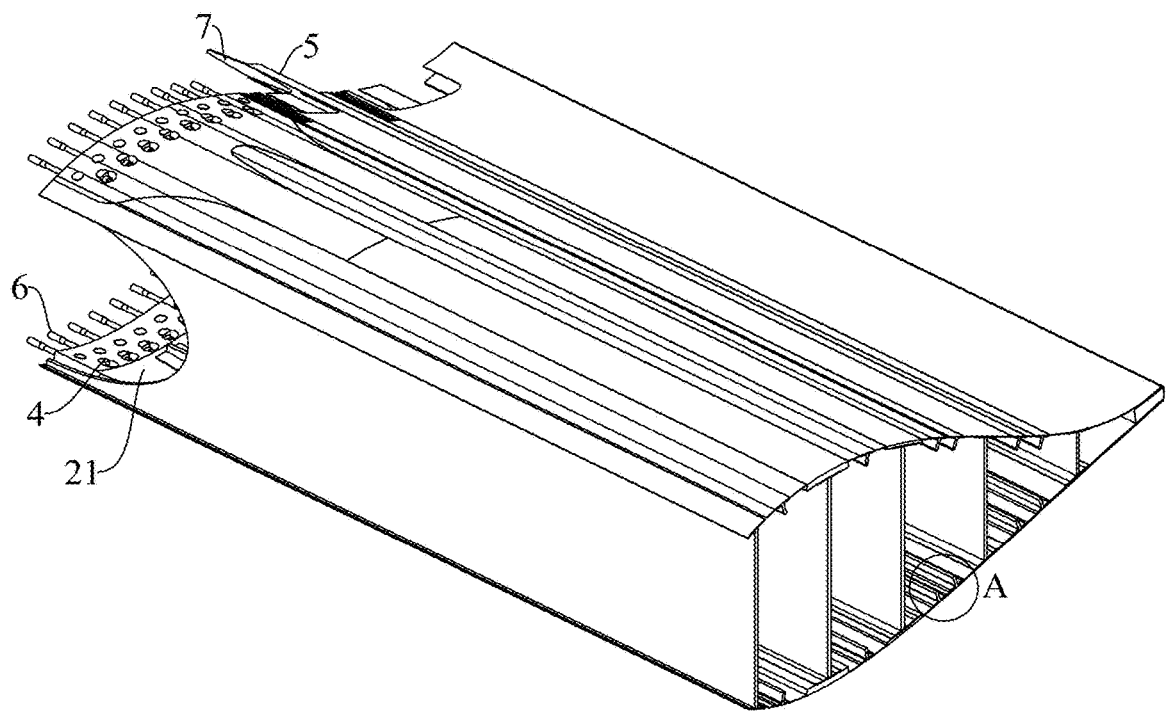
FIG. 3 is a schematic diagram of an assembly of the load-bearing beam and the bearing web according to an embodiment of the present invention.
Figure 4:
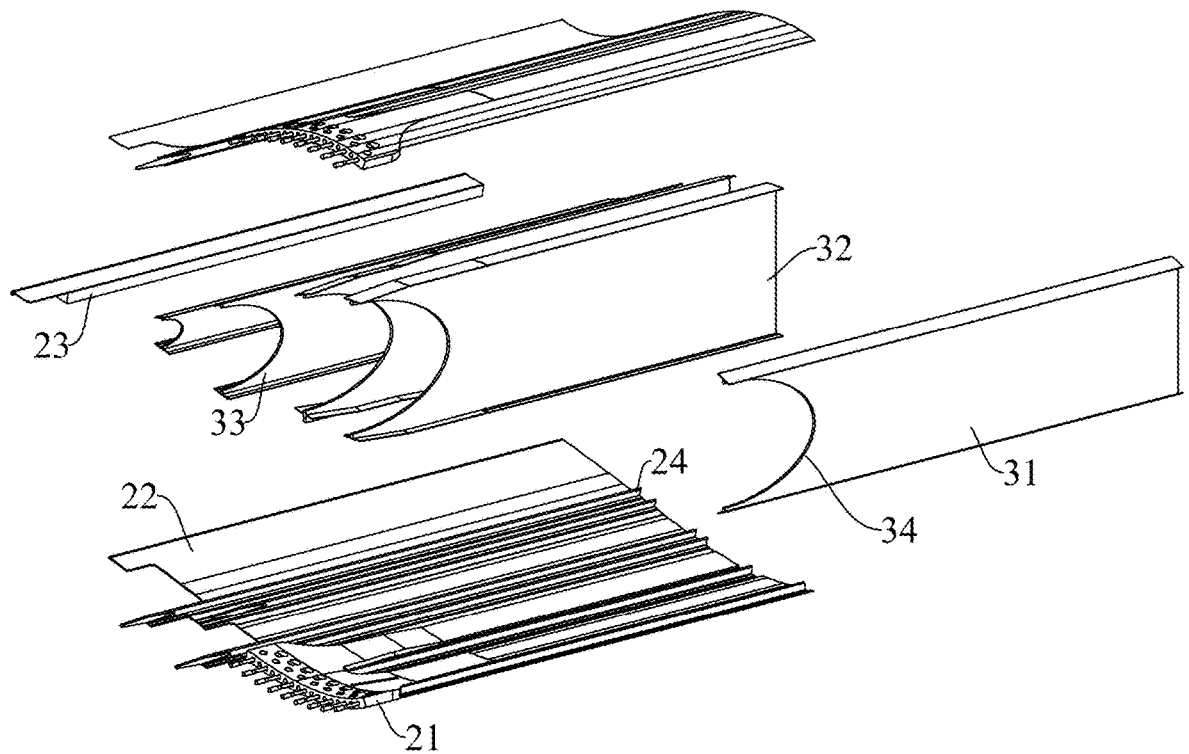
FIG. 4 is a schematic diagram of the explosive structure of the support frame according to an embodiment of the present invention.
Figure 5:
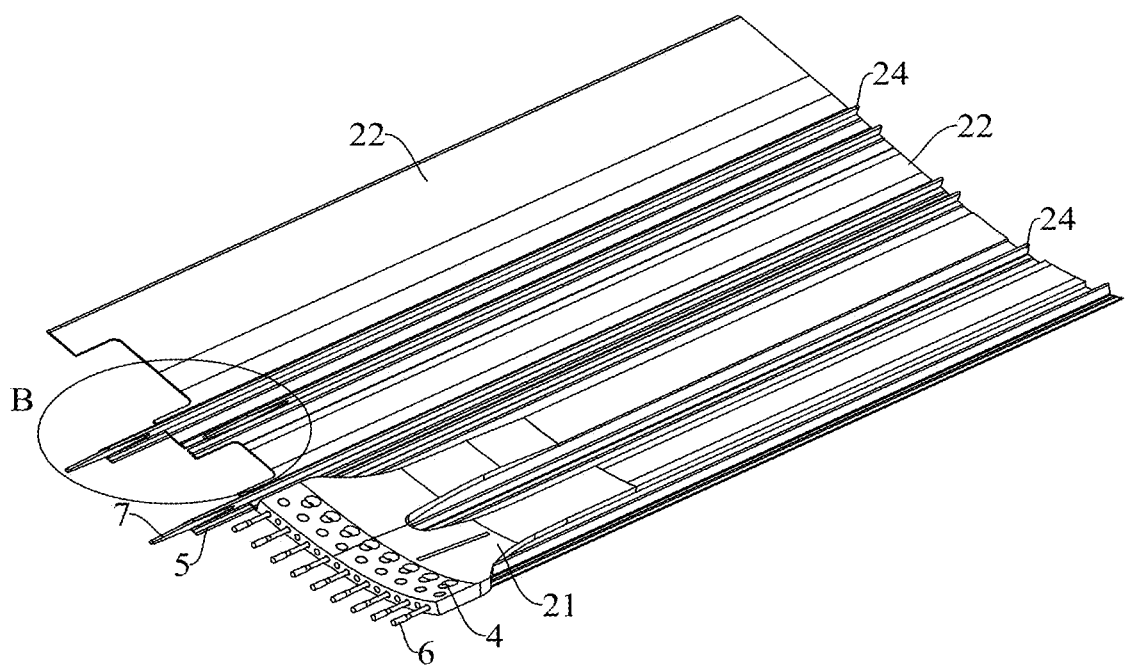
FIG. 5 is a schematic diagram of the structure of the load-bearing beam according to an embodiment of the present invention.

In the present invention, as shown in FIGS. 2 to 4, each of the load-bearing beams 2 and bearing webs 3 can be integrally formed using composite materials. The load-bearing beam 2 is fitted with the shell 1, and a support frame formed by the load-bearing beam 2 in conjunction with the bearing web 3 conforms to the contour shape of the blade. By forming a shell 1 structure with an outer skin wrapped around the support frame, the stability of the blade module structure is ensured while reducing the blade mass.

The present invention further discloses a connection structure adapted to the modular wind power blades described above. Specifically, as shown in FIG. 3, the connecting beam 21 and the T-shaped beam 24 are respectively provided with a first connection structure 4 and a second connection structure 5 at an end thereof, and two first connection structures 4 and two second connection structures 5 on two adjacent blade modules are respectively fixedly connected through a first connecting piece 6 and a second connecting piece 7.

The connecting beam 21 is provided at the middle portion 14 of the shell 1. The auxiliary beam plate 22 cooperates with the connecting beam 21 and the trailing edge beam 23 to cover the portions corresponding to the middle portion 14 and the trailing edge portion 15 of the shell 1. The T-shaped beam 24 is provided between two adjacent auxiliary beam plates 22 to enhance the connection strength of the load-bearing beam 2, so that the support frame provides stable support force to the shell 1 and ensures sufficient space between the load-bearing beam 2 and the shell 1, ensuring sufficient contact area between load-bearing beam 2 and shell 1 to avoid instability of shell 1 and ensure the structural stability of the blade module.

Further, fixed connection between adjacent blade modules is achieved by the two connection structures provided at the end of the connecting beam 21 and the T-beam 24 respectively. In the respective blade modules, the load-bearing beam 2 has a stable structure, and thus the stable connection of the two blade modules is achieved through connecting pieces provided on the two load-bearing beams 2.

In this embodiment, the connecting beams 21 on two adjacent blade modules are fixedly connected to each other through blade bolts. The T-shaped beams 24 spaced between the auxiliary beam plates 22 realize the fixed connection of the corresponding T-shaped beams 24 on the two adjacent blade modules through a mortise and tenon structure. Through these two connection methods, the blade modules are fixedly connected at multiple points in the circumferential direction at end thereof, ensuring the overall stability of the blade structure after connection.

Figure 12:
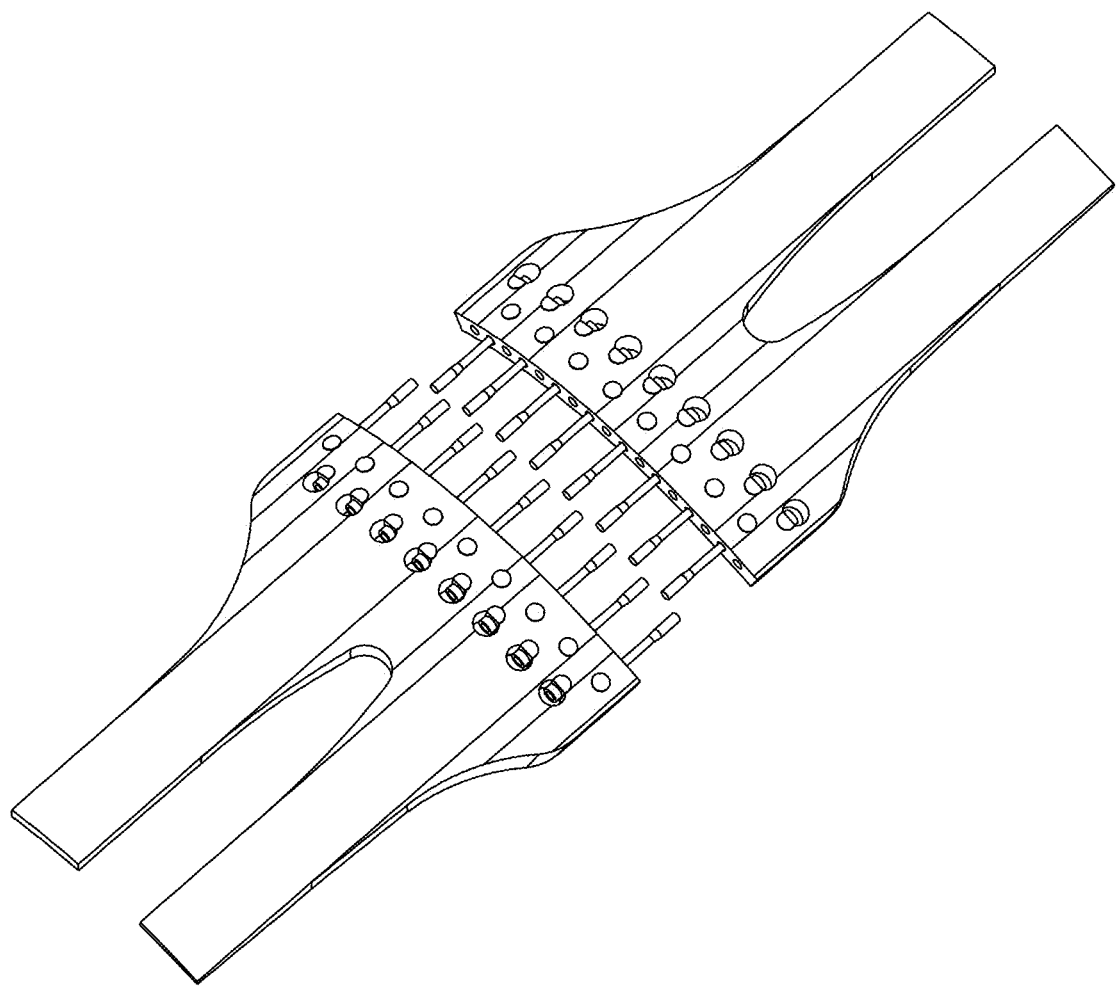
FIG. 12 is a schematic diagram of the installation of the first connecting piece in the first connection structure according to an embodiment of the present invention.

Specifically, as shown in FIG. 12, the first connection structure comprises a plurality of first ring holes 41 and a plurality of second ring holes 42 provided along different circumferential directions of the blade. The first and second ring holes 41, 42 are staggered and connected to an end face of the connecting beam 21 through axle holes 43. The first ring hole 41 is provided in form of a circular through hole, and the second ring hole 42 is provided in form of a gourd shaped through hole. The first connecting piece 6 comprises a cylindrical nut 61, a double-headed bolt 62, a semi-cylindrical spacer 63 and a round nut 64. The cylindrical nut 61 and the semi-cylindrical spacer 63 are disposed in the first ring hole 41 and the second ring hole 42 respectively. An end of the double-headed bolt 62 is screwed to the cylindrical nut 61 through the axle hole 43, or screwed to the round nut 64 passing through the semi-cylindrical spacer 63.

The gourd-shaped through hole facilitates the tightening and fixing of the round nut 64 and the end of the double-headed bolt 62, ensuring that there is no space restriction when using a tool to tighten the round nut 64, making it easy to operate.

The first ring holes 41 and the second ring holes 42 are staggered, so that the first connection structures 4 are evenly distributed at the end of the connecting beam 21 of two adjacent blade modules, thereby avoiding excessive damage to the structure of the connecting beam 21 on one side and improving the bearing capacity of the first connection structure 4.

Figure 13:
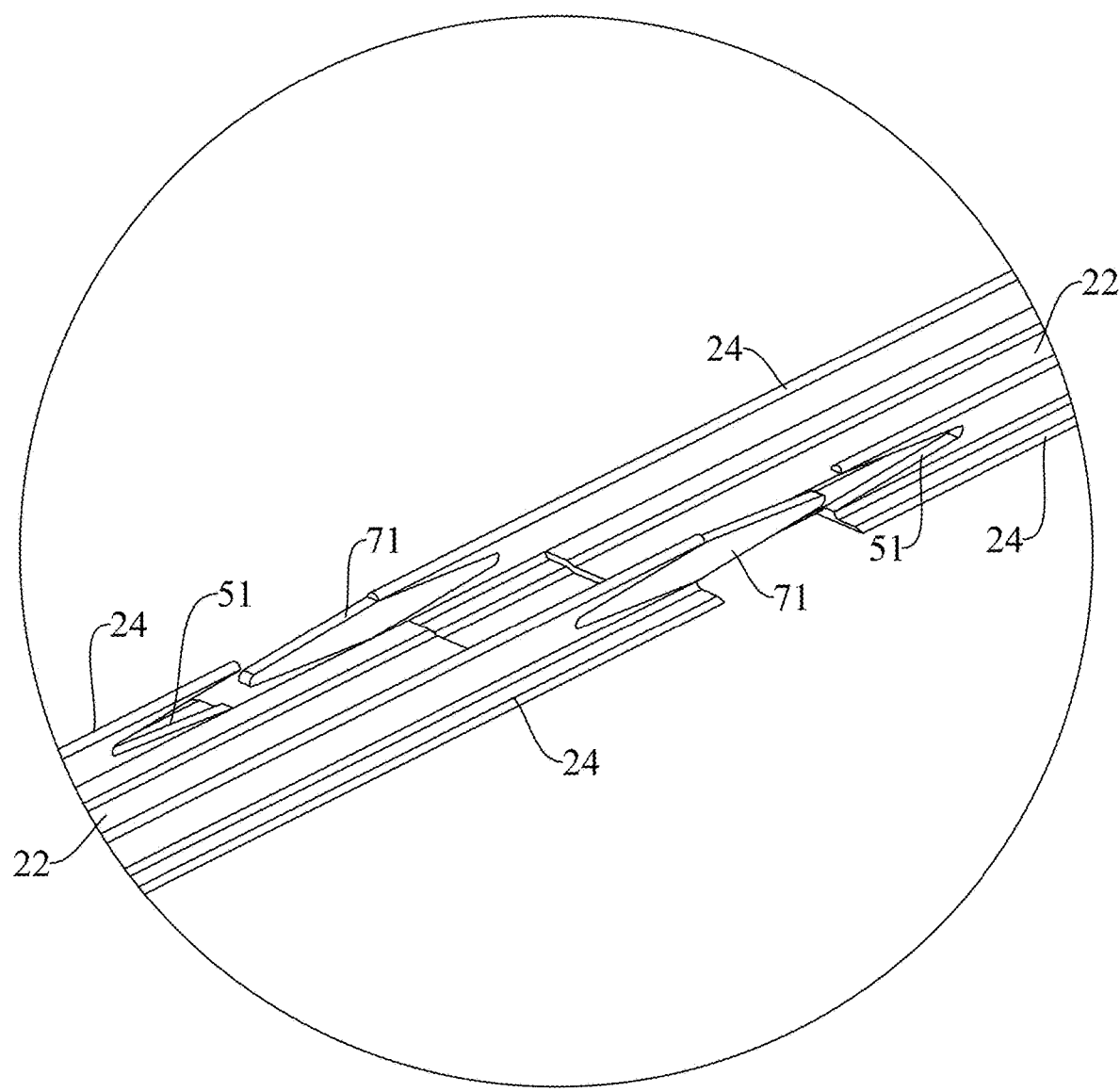
FIG. 13 is a schematic diagram of the installation of the second connecting piece in the second connection structure according to an embodiment of the present invention.

Further, as shown in FIG. 13, the second connection structure 5 comprises a mortise 51 provided at the end of the T-shaped beam 24, and the second connecting piece 7 comprises a tenon 71 that matches two mortises 51 on the opposite T-shaped beams 24 of the two blade modules. The mortise 51 is provided in form of a triangular structure, and the tenon 71 is provided in form of a diamond structure.

The tenon 71 is fixedly connected to the mortises 51 on both sides by using a proper amount of structural adhesive, and a biaxial cloth is laid up at the connection position after the connection is completed to enhance the connection strength, while the tenon 71 can be prevented from sliding out from the mortises 51.

The trailing edge beam 23 and the T-shaped beam 24 are both arranged along the axial direction of the blade, and extend from or retract into the end face of the shell 1. The trailing edge beams 23 and the T-shaped beams 24 correspondingly provided on two adjacent blade modules abut with each other at end thereof. In the connection structure of the two blade modules, the T-shaped beam 24 extends out of the end of the shell 1 and is bonded and fixed with the shell 1 of the other blade module, further enhancing the connection strength between the two blade modules.

A plurality of the T-shaped beams 24 is provided corresponding to the windward surface 11 and the leeward surface 12 along the circumferential direction of the blade, extending from or retracting into the end face of the shell 1 at intervals, thereby enhancing the stability of the connection structure.

In this embodiment, the connecting beam 21 is provided in one piece, comprising a main spar cap 213 and an auxiliary spar cap 212 that have a ring spar cap 211 provided on the same side thereof, both the main spar cap 213 and the auxiliary spar cap 212 being provided along the axial direction of the blade. The main spar cap 213 and the auxiliary spar cap 212 are provided close to the leading edge portion 13 and the trailing edge portion 15 respectively, and the main spar cap 213 is thicker than the auxiliary spar cap 212.

Figure 8:
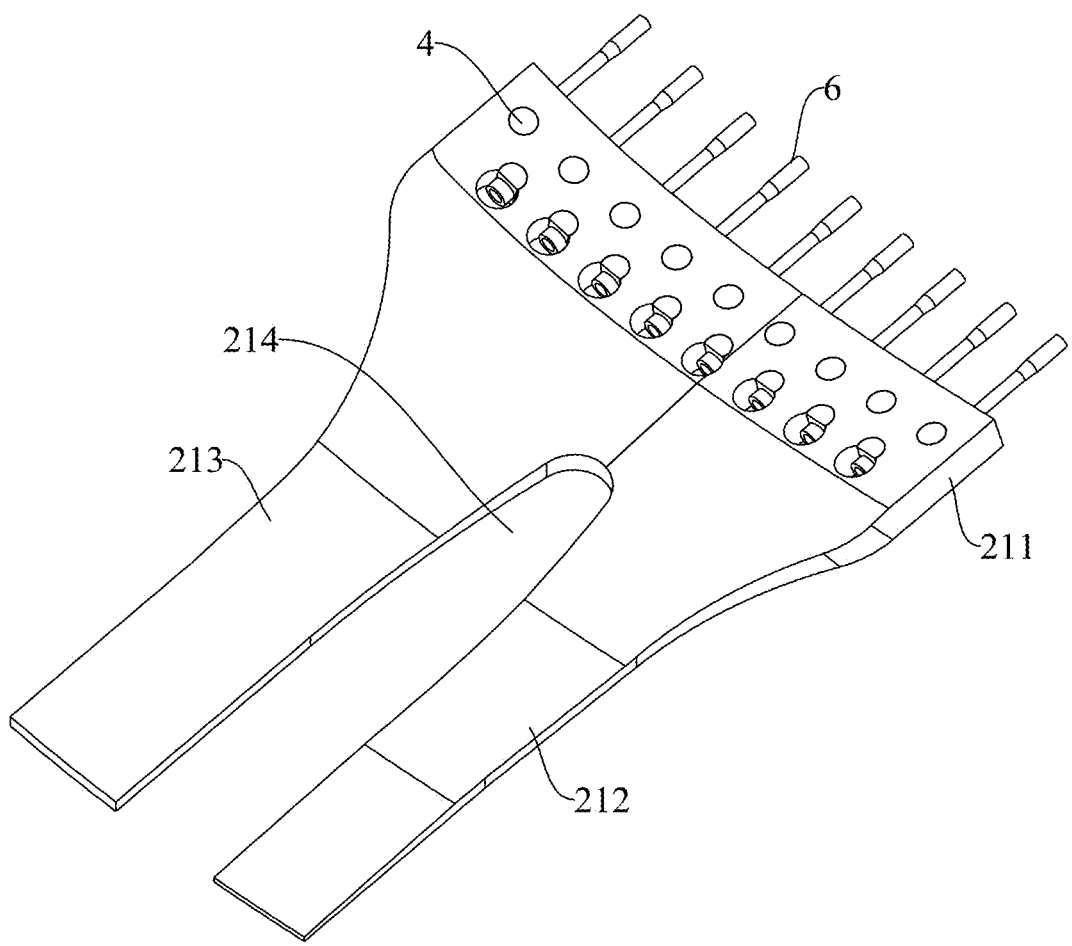
FIG. 8 is a schematic diagram of the structure of the connecting beam according to an embodiment of the present invention.
Figure 9:
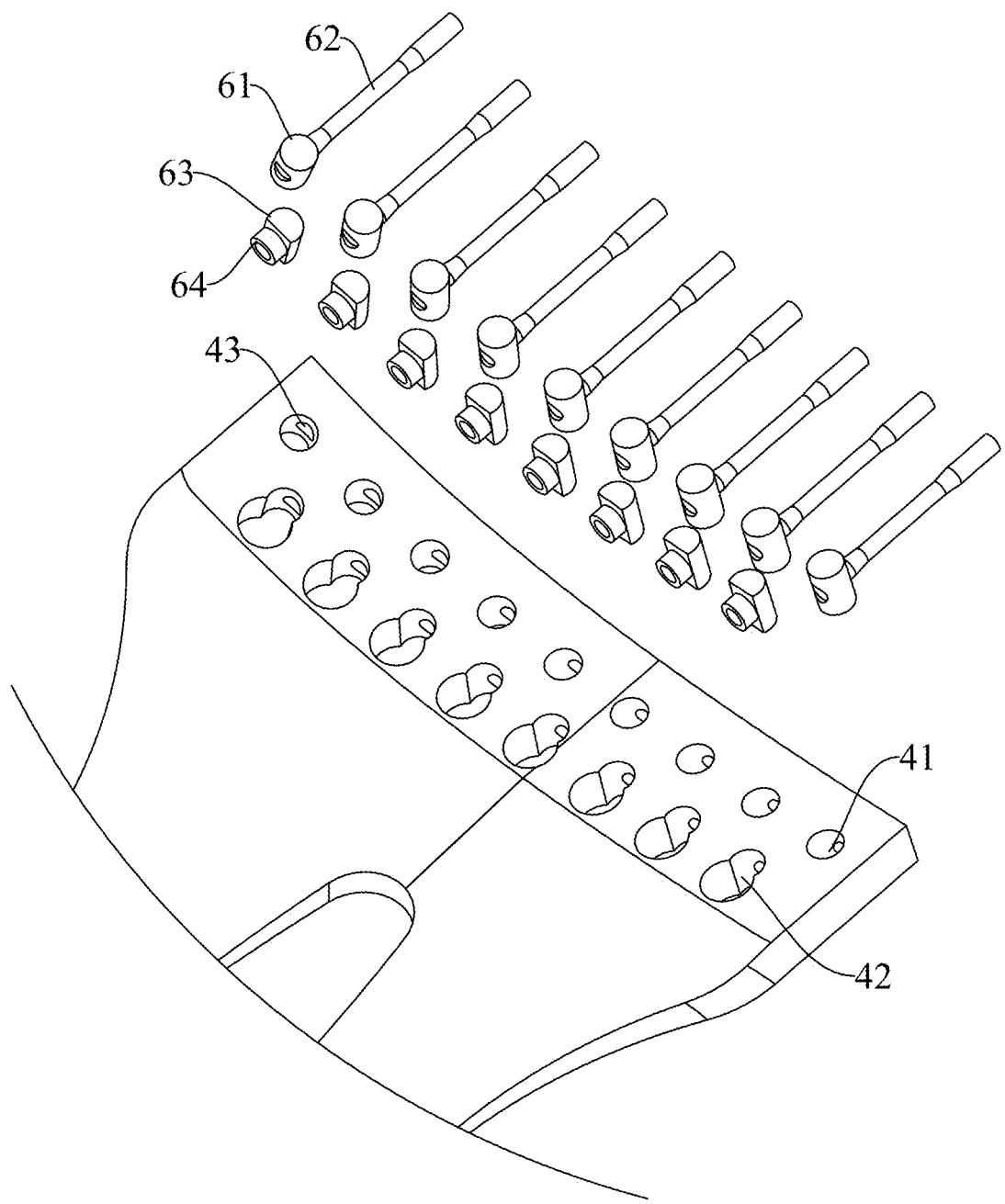
FIG. 9 is a schematic diagram of the connection between the first connection structure and the first connecting piece according to an embodiment of the present invention.
Figure 10:
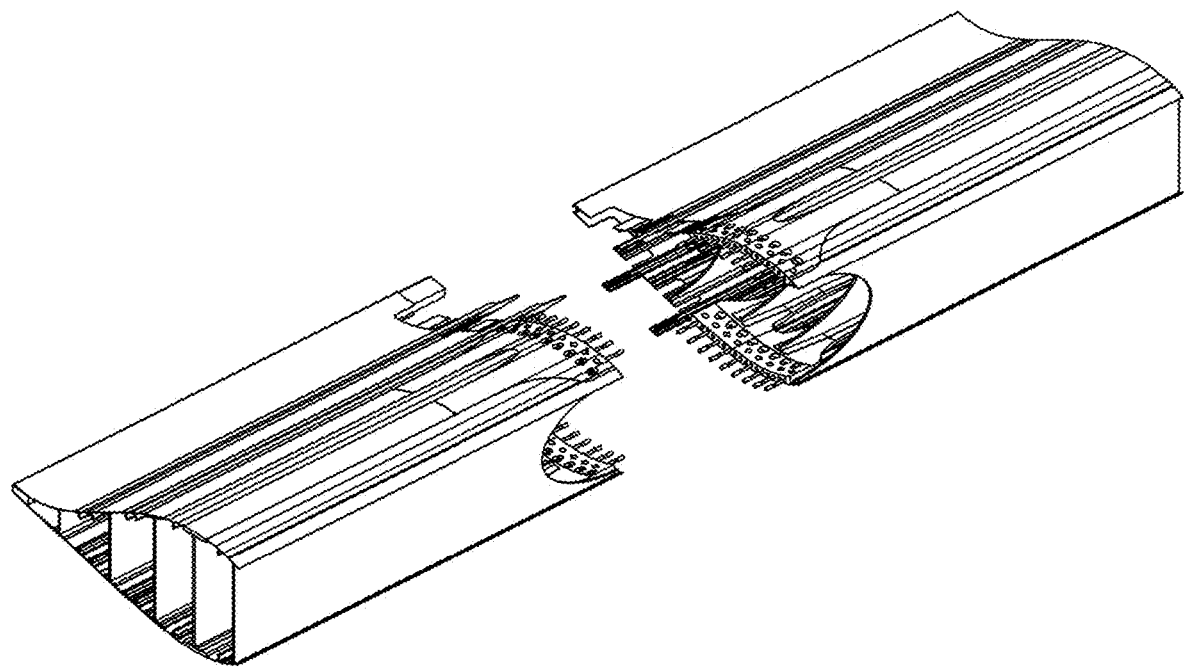
FIG. 10 is a schematic diagram of assembling two blade modules according to an embodiment of the present invention.

The connecting beam 21 adopts a pants-type structure, as shown in FIG. 8. The ring spar cap 211 cooperates with the main spar cap 213 and the auxiliary spar cap 212, with a notch portion 214 formed between the three. The notch portion 214 is configured to shrink towards the ring spar cap 211. Both sides of the ring spar cap 211 extend to the main spar cap 213 and the auxiliary spar cap 212 respectively, and are configured to shrink towards the notch portion 214. This ensures a smooth transition of the rigidity of the connecting beam 21 in its axial direction, improving the load-bearing capacity of connecting beam 21.

In this embodiment, as shown in FIG. 4, the bearing web 3 comprises a first web 31, a second web 32 and a third web 33 each provided with an arc-shaped notch 34 at an end thereof. The first web 31 is disposed on the leading edge portion 13 and abuts with the inner wall on both sides of the shell 1 respectively, the second web 32 abuts with the two connecting beams 21 respectively, and the third web 33 abuts with the auxiliary beam plates 22 on both sides of the shell 1 respectively.

The bearing web 3 is provided in form of a straight plate along the axial direction of the blade. By providing an arc-shaped notch 34 at an end of the bearing web, the stress concentration at the connection end is eliminated, improving the bearing capacity.

Figure 6:
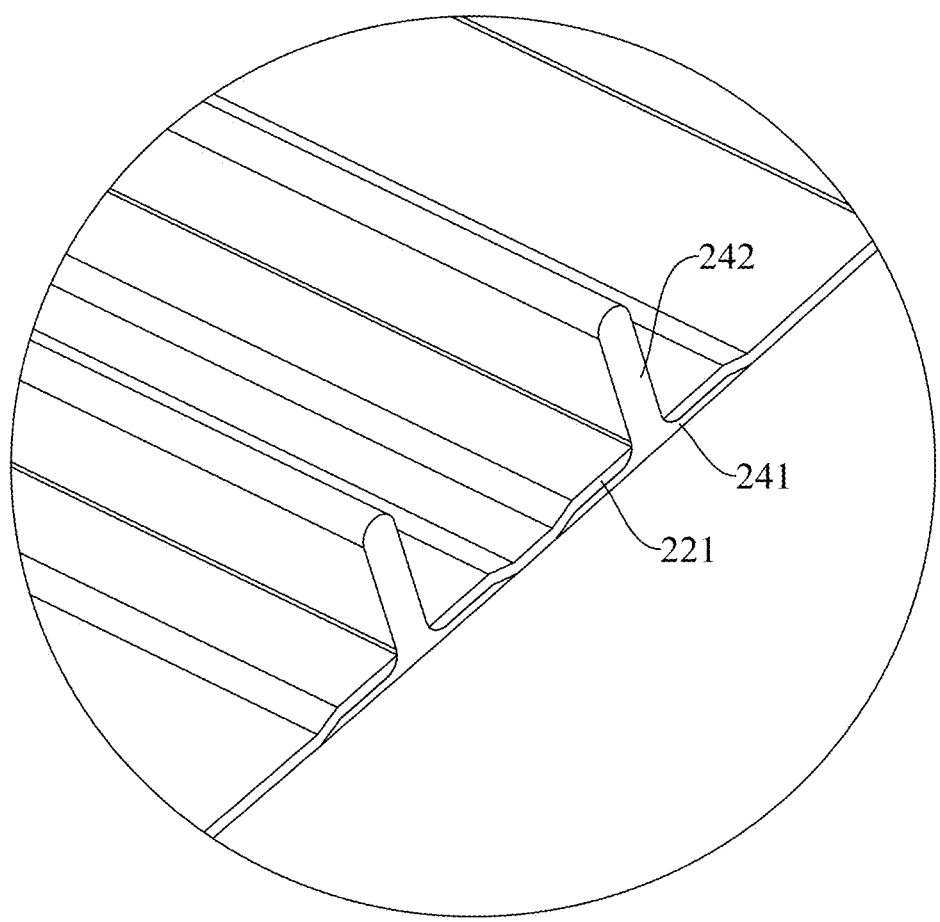
FIG. 6 is an enlarged view of the local structure at point A in in FIG. 3.
Figure 7:
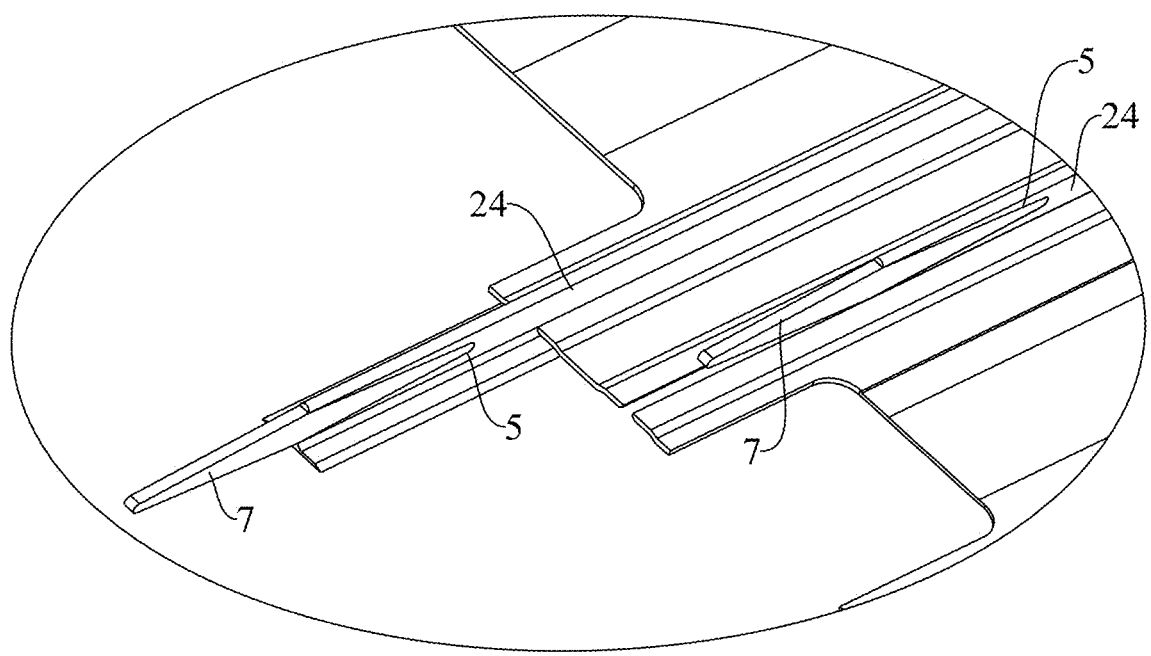
FIG. 7 is an enlarged view of the local structure at point B in in FIG. 5.

As shown in FIG. 6, the T-shaped beam 24 comprises a horizontal plate 241 and a vertical plate 242 arranged perpendicular thereto, and is fixedly connected to the two auxiliary beam plates 22 through the horizontal plate 241. A lap 221 is provided on the side of the auxiliary beam plate 22 facing the shell 1 corresponding to the horizontal plate 241. The lap 221 is concave towards its side away from the shell 1 by a depth adapted to the thickness of the horizontal plate 241.

Figure 11:
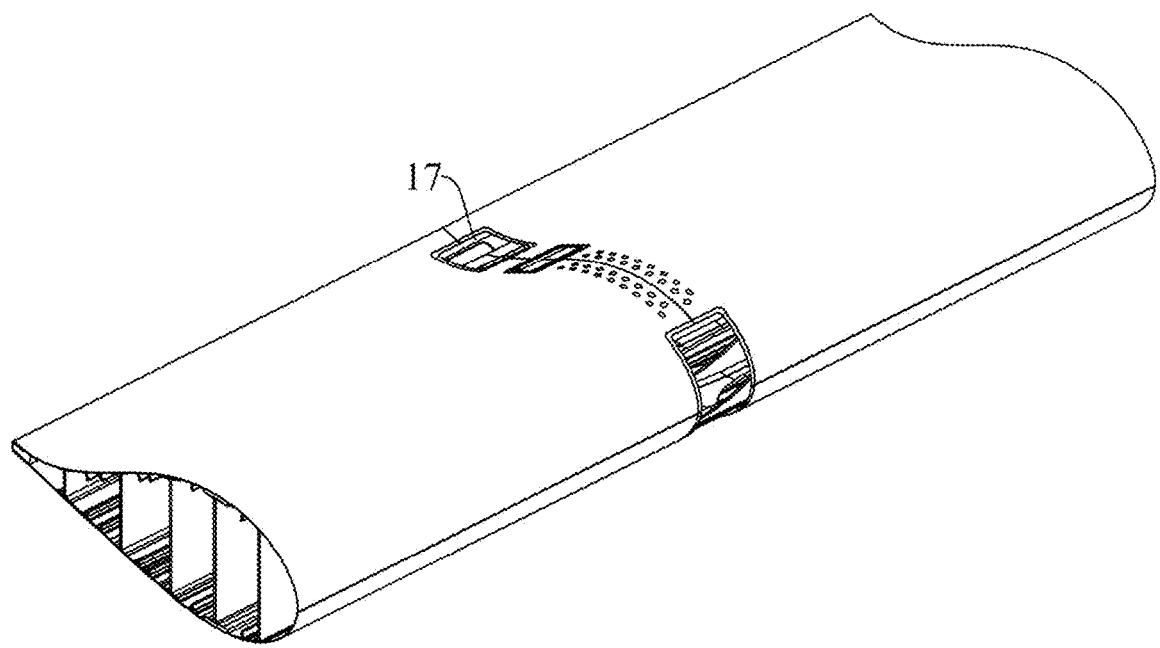
FIG. 11 is the schematic diagram after the assembly of the two-blade module in the embodiment of the invention.

As shown in FIG. 11, a hatch notch 16 is provided at an end of the shell 1, and two hatch notches 16 correspondingly provided on two connected blade modules form a hatch hole 17. The hatch hole is provided on the leading edge portion 13 of the shell 1, as well as on the windward side 11 and the leeward side 12 of the middle portion 14 and the trailing edge portion 15, respectively.

The hatch hole 17 is convenient for people to enter and exit. After the connection of the two blade modules is completed, adhesive is applied to the flange surface of the hatch hole 17, and a layer of outer skin is covered and fixed by means of adhesive and rivet to restore the hole to a continuous aerodynamic shape. Then, for the outside of the shell 1 in the connection area, two layers of biaxial cloth is laid up along its circumference to strengthen the connection structure.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A modular wind turbine blade comprises a plurality of blade modules arranged along an axial direction thereof, wherein each of the blade modules comprises a shell and a load-bearing beam and a bearing web provided therein, wherein the load-bearing beam is fitted with the shell, and the bearing web is provided along a chord length of the blade, wherein the shell comprises a windward surface and a leeward surface, and is provided in form of a leading edge portion, a middle portion, and a trailing edge portion along a chord length direction of the blade, wherein the load-bearing beam comprises a connecting beam, an auxiliary beam plate, a trailing edge beam, and a T-shaped beam, the connecting beam being provided on a forward side and a rear side of the middle portion, the trailing edge beam being embedded at an edge of the trailing edge portion, the auxiliary beam plate being provided on the middle portion and the trailing edge portion, and the auxiliary beam plate being provided along a circumferential direction of the blade, and the T-shaped beam being connected to the auxiliary beam plate, wherein the connecting beam is provided in one piece, comprising a main spar cap and an auxiliary spar cap that have a ring spar cap on a same side thereof, both the main spar cap and the auxiliary spar cap being provided along the axial direction of the blade, wherein the auxiliary spar cap is provided closer to the trailing edge portion than the main spar cap, the main spar cap is wider than the auxiliary spar cap, wherein the ring spar cap cooperates with the main spar cap and the auxiliary spar cap, and a notch portion is configured to shrink towards the ring spar cap, and wherein the ring spar cap extends to the main spar cap and the auxiliary spar cap, and is configured to shrink towards the notch portion.

2. The modular wind turbine blade according to claim 1, wherein the trailing edge beam and the T-shaped beam are both arranged along the axial direction of the blade, and extend from or retract into an end face of the shell, and wherein for two adjacent blade modules of the plurality of blade modules, the trailing edge beams and the T-shaped beams abut with each other at ends thereof, respectively.

3. The modular wind turbine blade according to claim 1, wherein the bearing web comprises a first web portion, a second web portion and a third web portion, each portion provided with an arc-shaped notch at an end thereof, and wherein the first web portion is disposed on the leading edge portion and abuts with an inner wall on both sides of the shell respectively, the second web portion abuts with the connecting beam, and the third web portion abuts with the auxiliary beam plate.

4. The modular wind turbine blade according to claim 1, wherein the T-shaped beam comprises a horizontal plate and a vertical plate arranged perpendicular thereto, and is fixedly connected to the auxiliary beam plate through the horizontal plate, and wherein a lap is provided on a side of the auxiliary beam plate facing the blade shell corresponding to the horizontal plate, the lap being concave towards its side away from the blade shell by a depth adapted to a thickness of the horizontal plate.

5. The modular wind turbine blade according to claim 1, wherein a hatch notch is provided at an end of the shell, and two hatch notches correspondingly provided on two connected blade modules of the plurality of blade modules form a hatch hole.

6. The modular wind turbine blade according to claim 1, wherein the connecting beam is provided with a first connection structure and a second connection structure at an end thereof, and the T-shaped beam is provided with a first connection structure and a second connection structure at an end thereof, and wherein the first connection structure of the connecting beam, the first connection structure of the T-shaped beam, the second connection structure of the connecting beam, and the second connection structure of the T-shaped beam on two adjacent blade modules are respectively fixedly connected through a first connecting piece and a second connecting piece.

7. The modular wind turbine blade according to claim 6, wherein the first connection structure of the T-shaped beam comprises a plurality of first ring holes and a plurality of second ring holes provided along different circumferential directions of the blade, the first and second ring holes being staggered and connected to an end face of the connecting beam through axle holes, and wherein each of the first ring holes is provided in form of a circular through hole, each of the second ring holes is provided in form of a gourd shaped through hole.

8. The modular wind turbine blade according to claim 7, wherein the first connecting piece comprises a cylindrical nut, a double-headed bolt, a semi-cylindrical spacer and a round nut, the cylindrical nut and the semi-cylindrical spacer being disposed in each of the first ring holes and each of the second ring holes respectively, an end of the double-headed bolt being screwed to the cylindrical nut through each of the axle holes, or screwed to the round nut passing through the semi-cylindrical spacer.

9. The modular wind turbine blade according to claim 6, wherein the second connection structure of the T-shaped beam comprises a mortise provided at an end of the T-shaped beam, and the second connecting piece comprises a tenon, and wherein the mortise is provided in form of a triangular structure, and the tenon is provided in form of a diamond structure.

* * * * *